(12) United States Patent
Kwon et al.

(10) Patent No.: US 8,385,368 B2
(45) Date of Patent: Feb. 26, 2013

(54) METHOD FOR INSERTING PARITY TO FRAME CONTROL HEADER

(75) Inventors: Yeong Hyeon Kwon, Anyang-Si (KR); Min Seok Noh, Anyang-Si (KR); Sung Ho Moon, Anyang-Si (KR); Dong Cheol Kim, Anyang-Si (KR); Jin Sam Kwak, Anyang-Si (KR); Hyun Woo Lee, Anyang-Si (KR); Seung Hee Han, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 12/680,766

(22) PCT Filed: Nov. 12, 2008

(86) PCT No.: PCT/KR2008/006664
§ 371 (c)(1),
(2), (4) Date: Mar. 30, 2010

(87) PCT Pub. No.: WO2009/064110
PCT Pub. Date: May 22, 2009

(65) Prior Publication Data
US 2010/0208594 A1   Aug. 19, 2010

Related U.S. Application Data

(60) Provisional application No. 60/988,091, filed on Nov. 14, 2007.

(30) Foreign Application Priority Data

Mar. 11, 2008  (KR) .................. 10-2008-0022474

(51) Int. Cl.
*H04J 3/24* (2006.01)
(52) U.S. Cl. .................. 370/474; 370/203; 375/260
(58) Field of Classification Search .......... 370/203–210, 370/465–467, 471, 474; 375/260–265
See application file for complete search history.

(56) References Cited

U.S. PATENT DOCUMENTS

| | | | |
|---|---|---|---|
| 5,710,755 A | 1/1998 | Chen | |
| 6,961,388 B2 | 11/2005 | Ling et al. | |
| 7,792,205 B2 * | 9/2010 | Zhang et al. | 375/262 |
| 7,991,056 B2 * | 8/2011 | Hansen et al. | 375/260 |
| 2007/0110108 A1 * | 5/2007 | Kang et al. | 370/515 |

* cited by examiner

*Primary Examiner* — Ricky Ngo
*Assistant Examiner* — Kan Yuen
(74) *Attorney, Agent, or Firm* — Birch, Stewart, Kolasch & Birch, LLP (57) ABSTRACT

A method for inserting parity into an FCH is disclosed. A method for inserting parity into a frame control header includes channel-encoding, by an additional channel encoder, a frame control header bit applied to a legacy encoder, and generating an additional codeword, and mapping the codeword generated by the legacy encoder and the additional codeword to subcarriers. This method inserts parity into the FCH, and defines a new FCH, such that it extends an FCH coverage simultaneously while maintaining a compatibility with a legacy system. Also, it may add additional energy to a legacy FCH or may give a coding gain to the same legacy FCH, such that it can extend information transferable using reserved bits of the FCH.

14 Claims, 4 Drawing Sheets

(FCH may include at least one of
information indicating a support or
non-support of a legacy terminal,
a new channel indication bit, and
information for MAP and burst
in a reserved bit)

METHOD FOR INSERTING PARITY TO FRAME CONTROL HEADER

This application is the National Phase of PCT/KR2008/006664 filed on Nov. 12, 2008, which claims priority under 35 U.S.C. 119(e) to U.S. Provisional Application No. 60/988,091 filed on Nov. 14, 2007 and under 35 U.S.C. 119(a) to Patent Application No. 10-2008-0022474 filed in Republic of Korea on Mar. 11, 2008. All of which are hereby expressly incorporated by reference into the present application.

TECHNICAL FIELD

The present invention relates to an IEEE 802.16-based system, which has a lower compatibility with the IEEE 802.16, and more particularly to a parity insertion method which extends a coverage of a frame control header (FCH), improves robustness of the FCH, and extends transferable information.

BACKGROUND ART

Generally, an IEEE 802.16 system adds functions to a conventional air interface, and improves a conventional scheme, such that the IMT-Advanced system is implemented. In this case, a new system must maintain a conventional system without any change. Therefore, basic requirements of the new system are affected by characteristics of the conventional system.

Figure 1:
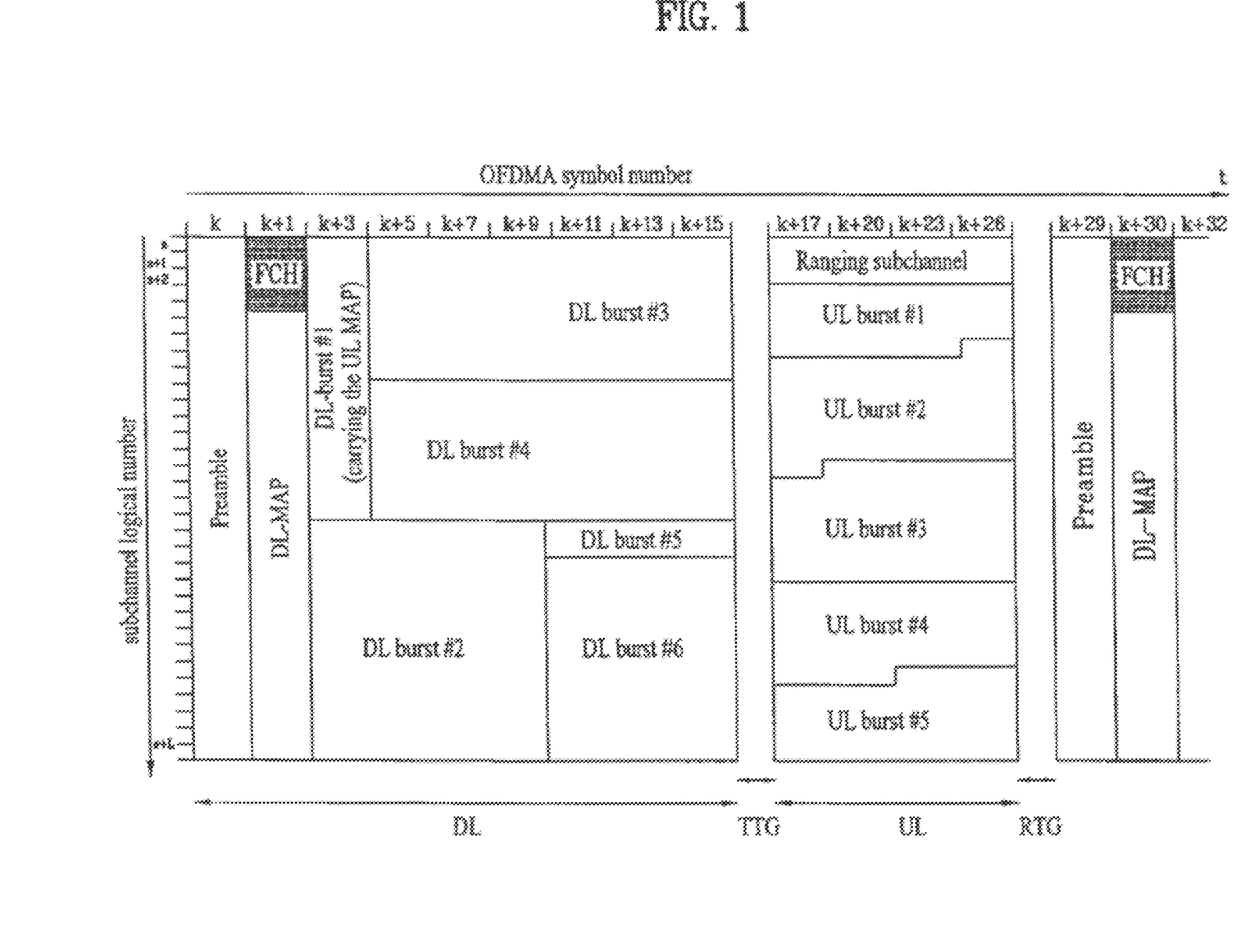
FIG. 1 shows an example of an IEEE 802.16 frame structure.

FIG. 1 shows an IEEE 802.16 frame structure.

In order to allow a legacy terminal to access a system using the structure of FIG. 1, a preamble and an FCH must be discriminated and the discriminated result must be readily understood. Also, more MAP information must be read for a communication mode, and information needed for this reading action is contained in the FCH.

Therefore, all of the legacy terminal and a new system's terminal must read a conventional preamble and the FCH, and this reading operation can be implemented by system parameters prescribed in a conventional legacy system. That is, the new system based on the legacy maintains shortcomings of the conventional system, for example, a coverage shortage, information shortage, etc.

The following Table 1 represents contents indicated by the FCH.

With reference to Table 1, 'FCH' represents which one of a channel coding or a repetition coding has been used by the next MAP.

As can be seen from Table 1, a basic data bit is repeated twice in the FCH defined as each segment, a channel code (i.e., a channel code) uses a 1/2 convolutional code (133,171), and this 1/2 convolutional code (133,171) is repeatedly coded four times. Therefore, a total code rate (i.e., code rate) is set to 1/16, such that this code rate of 1/16 is considered to be very robust. However, this convolutional code has a poor performance, such that a method for improving this poor performance is needed. That is, an actual coding gain (i.e., coding gain) is obtained by the 1/2 convolutional code, and a slope of a BER graph is decided by a minimum distance of this 1/2 convolutional code. A gain corresponding to 1/4 (i.e., a gain caused by repetition) is 6 dB, such that a performance is shifted to a lower part by an SNR of 6 dB. The bit repetition produces a gain of 1.5 dB~3 dB according to a decoder type. However, the repetition code is considered to be very improper for obtaining a channel coding gain. Therefore, a method for enabling the system to strongly transfer the FCH to a terminal is decided according to a difference between FCH construction methods.

If system coverage increases, FCH coverage enhancement is needed, and reliability of the decoded result is needed.

DISCLOSURE

Technical Problem

Accordingly, the present invention is directed to a method for inserting parity into a frame control header (FCH) that substantially obviates one or more problems due to limitations and disadvantages of the related art.

An object of the present invention is to provide a parity insertion method which extends a coverage of an FCH, improves robustness of the FCH, and extends transferable information.

Technical Solution

To achieve these objects and other advantages and in accordance with the purpose of the invention, as embodied and

TABLE 1

| Syntax | Size (bit) | Notes |
|---|---|---|
| DL_Frame_Prefix_Format(){ | — | — |
| Used subchannel bitmap | 6 | Bit#0: Subchannel group 0 |
| | | Bit#1: Subchannel group 1 |
| | | Bit#2: Subchannel group 2 |
| | | Bit#3: Subchannel group 3 |
| | | Bit#4: Subchannel group 4 |
| | | Bit#5: Subchannel group 5 |
| Reserved | 1 | Shall be set to zero |
| Repetition_Coding_Indication | 2 | 0b00: No repetition coding on DL_MAP |
| | | 0b01: Repetition coding of 2 used on DL_MAP |
| | | 0b10: Repetition coding of 4 used on DL_MAP |
| | | 0b11: No repetition coding of 6 used on DL_MAP |
| Coding_Indication | 3 | 0b000: CC encoding used on DL_MAP |
| | | 0b001: BTC encoding used on DL_MAP |
| | | 0b010: CTC encoding used on DL_MAP |
| | | 0b011: ZT CC encoding used on DL_MAP |
| | | 0b100: CC encoding with optional interleaver |
| | | 0b101: LDPC encoding used on DL_MAP |
| | | 0b110 to 0b111: Reserved |
| DL_Map_Length | 8 | — |
| Reserved | 4 | Shall be set to zero |
| } | — | — | broadly described herein, a method for inserting parity into a frame control header comprises: channel-encoding, by an additional channel encoder, a frame control header bit applied to a legacy encoder, and generating an additional codeword; and mapping the codeword generated by the legacy encoder and the additional codeword to subcarriers.

The generating of the additional codeword may include applying any one of a convolutional code, a block code, and a repetition code to the frame control header bit.

The generating of the additional codeword may include interleaving, by an additional interleaver, the frame control header bit, and encoding the interleaved bits.

The mapping of the codewords to the subcarriers may include mapping the additional codeword to a resource area which is located at any one of a first position preceding a legacy preamble, a second position following a legacy FCH, and a third position consecutive to an additional preamble.

The frame control header bit may include at least one of a CRC code for a header check sequence, a specific bit selected among bits indicating the number of frames, and information of a MIMO operation mode.

The frame control header bit may include at least one of information indicating a support or non-support of a legacy terminal, a new channel indication bit, and information for MAP and burst in a reserved bit.

The frame control header bit may include additional bits arranged to be consecutive to a conventional FCH structure, and the generating the additional codeword includes applying only legacy bits to the legacy encoder, and applying the additional bits to the additional channel encoder.

In another aspect of the present invention, there is provided a method for inserting parity into a frame control header including: channel-encoding, by a legacy encoder, a frame control header bit, and generating a codeword; channel-encoding, by an additional channel encoder, the codeword, and generating an additional codeword; and mapping the codeword generated by the legacy encoder and the additional codeword to subcarriers.

The frame control header bit may include at least one of a CRC code for a header check sequence, a specific bit selected among bits indicating the number of frames, and information of a MIMO operation mode.

The frame control header bit may include at least one of information indicating a support or non-support of a legacy terminal, a new channel indication bit, and information for MAP and burst in a reserved bit.

In another aspect of the present invention, there is provided a method for inserting parity into a frame control bit including: channel-encoding, by an additional channel encoder, an output value to which a convolutional code is applied by a legacy encoder which sequentially applies a convolutional code and a repeated code to a frame control header bit, and generating an additional codeword; and mapping the additional codeword to subcarriers.

The generating of the additional codeword may include channel-encoding an output value obtained when the convolutional code is applied to the frame control header bit at a code rate of 1/2.

The generating of the additional codeword may include channel-encoding the output value to which the convolutional code is applied at another code rate which is different from the code rate made when the legacy encoder applies the repeated code.

In another aspect of the present invention, there is provided a method for inserting parity into a frame control header including: inserting a repeated parity in which parity of the frame control header is repeated to be consecutive to a sub-channel of the frame control header within an OFDM symbol of the frame control header; channel-encoding, by a legacy encoder, a frame control header in which the repeated parity is inserted, and generating a codeword; and mapping the generated codeword to subcarriers.

In another aspect of the present invention, there is provided a method for inserting parity into a frame control header including: inserting a repeated parity in which parity of the frame control header is repeated, into the same sub-channel as that of the frame control header at another OFDM symbol different from that of the frame control header; channel-encoding, by a legacy encoder, the frame control header in which the repeated parity is inserted, and generating a codeword; and mapping the generated codeword to subcarriers.

Advantageous Effects

According to embodiments of the present invention, the present invention inserts parity into the FCH, and defines a new FCH, such that it extends an FCH coverage simultaneously while maintaining a compatibility with a legacy system. Also, the present invention may add additional energy to a legacy FCH or may give a coding gain to the same legacy FCH, such that it can extend information capable of being transferred using reserved bits of the FCH.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The following embodiments of the present invention may be modified into various formats, and the scope of the present invention is not limited to only the following embodiments and can also be applied to other examples.

If there is a need for the FCH coverage to be increased, the FCH structure must be improved to satisfy system requirements. For this purpose, additional parity can be used. That is, in order to increase the coverage, additional resources may be concerned with a legacy FCH.

A conventional FCH is transferred to a single OFDM over 4 sub-channels. In this case, the number of available subcarriers is denoted by 48×4=192, and the coding of 1/16 is applied to the resultant subcarriers. The above-mentioned structure has been previously designed to be operated like the legacy. In order to transfer additional parities (e.g., parity bits of a repetition or channel code) to the aforementioned structure, the additional parities must be transferred to the same or new OFDM symbol. If the additional parities are transferred to the same OFDM symbol, they depend on the FFT size, and the power boosting effect is lost. Otherwise, if additional parity information is transferred to other OFDM symbols, additional energy may be added to the parity and the added result may then be transferred. A terminal of a new system capable of understanding the above-mentioned structure can obtain the effect of coverage enhancement.

In order to connect additional resources to the FCH, the repetition parity may be used.

If parities to be added are all or some of original codes, a new channel code is no longer required, a method for additionally inserting a repeated symbol into the same OFDM symbol and a method for inserting the repeated symbol into another OFDM symbol may be considered.

If the repeated symbol is inserted into the same OFDM symbol, additional resources must be used in a segment, such that successive additional resources may be used in a sub-channel having a conventional FCH. The method for inserting parity in the same OFDM symbol is unable to acquire power enhancement.

In case of using another OFDM symbol, it is preferable that the OFDM symbol may be located before a preamble. In this case, resources to be used may be exemplarily set to those of a permutation of a symbol having the FCH, but there is no need to limit the above resources to only this example and the scope of these resources can also be applied to other examples as necessary. A sub-channel to be used may be set to the above sub-channel used by the FCH without any change, and there is no need to limit this sub-channel to only the above example, so that the sub-channel can also be applied to other examples as necessary. Provided that specific information indicating which one of subcarriers is used for a specific FCH at which symbol using which permutation is pre-defined between a base station and a terminal, there are no problems in decoding the terminal.

For another example, additional channel codes may be used to relate additional resources to a legacy FCH.

In case of accommodating the channel encoding defined in the legacy without any change, a performance of a coding gain is not improved although the repetition is carried out. In order to improve this performance, an additional channel coding process is needed.

For this purpose, the additional convolutional code or block code, or an iterative code (e.g., a LDPC or a turbo code) may be considered. In case of using the same channel code, another interleaver may be applied to a sequence to be encoded for acquiring a turbo-decoding effect at a reception end. An information bit sequence applied to a new code may be an FCH bit or a channel-coded codeword.

Figure 2:
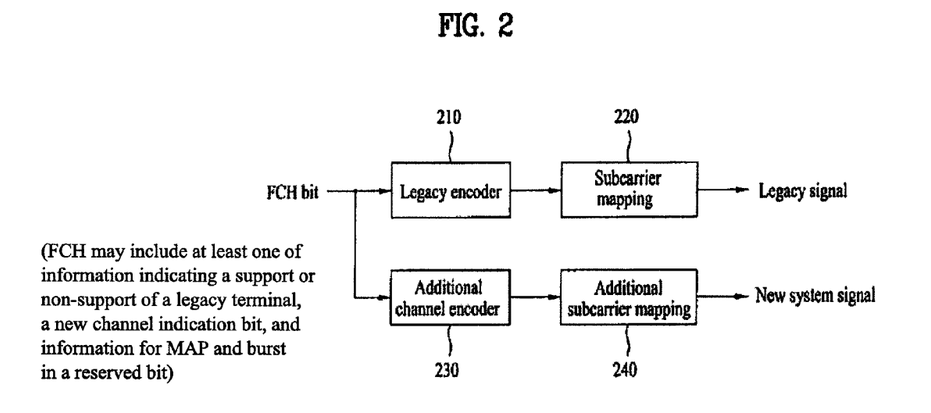
FIG. 2 is a block diagram illustrating a parity insertion device according to one embodiment of the present invention.

FIG. 2 is a block diagram illustrating a parity insertion device according to one embodiment of the present invention.

Referring to FIG. 2, a legacy encoder 210 applies a convolutional code and a repetition code to an FCH bit, such that it generates a codeword for a legacy terminal.

An additional channel encoder 230 performs additional channel coding on the FCH bit received in the legacy encoder 210, such that it generates an additional codeword.

A channel encoder 230 additionally used for a new system may use a convolutional coding used for a legacy, a linear block coding, or an iterative coding.

A subcarrier mapping unit 220 and an additional subcarrier mapping unit 240 map a codeword generated by the legacy encoder 210 and an additional codeword generated by the additional channel encoder 230 to subcarriers.

Figure 3:
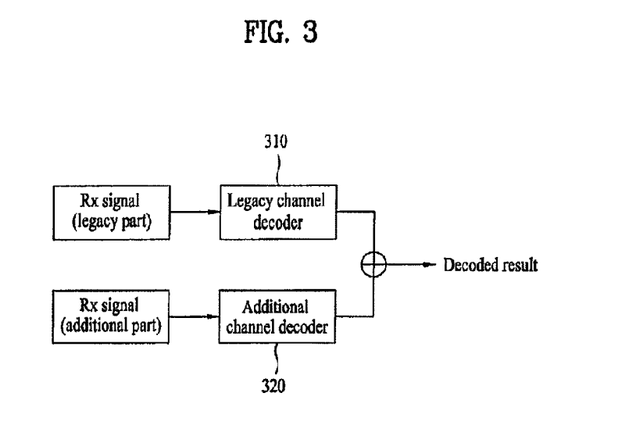
FIG. 3 is a block diagram illustrating a device for decoding a signal generated from the device of FIG. 2 according to the present invention.

FIG. 3 is a block diagram illustrating a device for decoding a signal generated from the device of FIG. 2 according to the present invention.

If only the information bit of the FCH is used as an information part, a reception end may selectively decode this information using either a legacy method or a new channel code.

As shown in FIG. 3, a legacy part and an additional part are simultaneously decoded by a channel decoder 310 and an additional channel decoder 320, respectively, a method for combining the decoded results with each other may be carried out.

Figure 4:
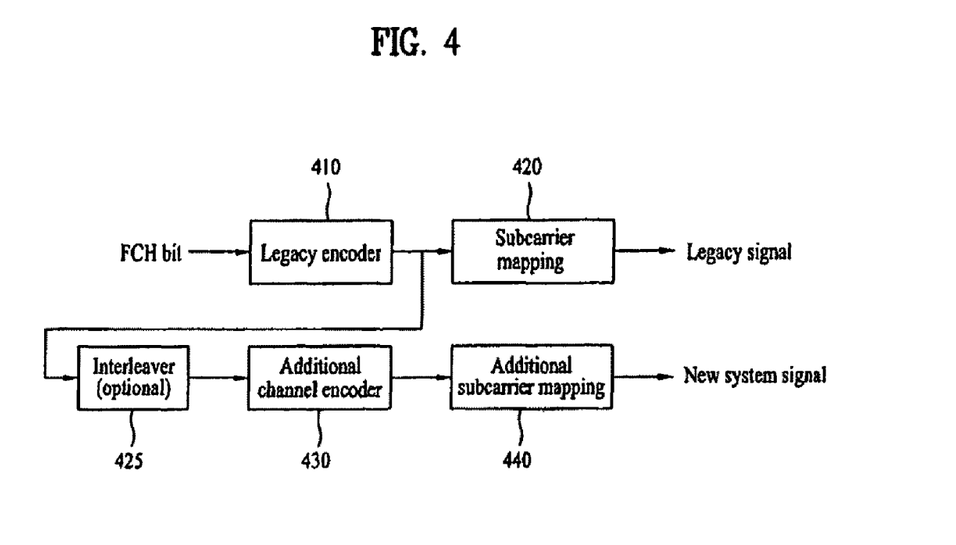
FIG. 4 is a block diagram illustrating a parity insertion device according to another embodiment of the present invention.

FIG. 4 is a block diagram illustrating a parity insertion device according to another embodiment of the present invention.

Referring to FIG. 4, the legacy encoder 410 applies a convolutional code and a repetition code to the FCH bit, such that it generates a codeword for the legacy terminal.

An interleaver 425 performs interleaving of the codeword generated by the legacy encoder 410, and transmits the interleaving result to the additional channel encoder 430. However, the interleaver 425 may be omitted as necessary.

The additional channel encoder 430 channel-encodes the codeword generated by the legacy encoder 410, such that it generates an additional codeword. The additional channel encoder 430 may use all FCH codewords generated by the legacy encoder 410 as an information part. Otherwise, the additional channel encoder 430 may use only some parts of the FCH codewords as such an information part. Additional information capable of being added by a new system can be applied to the channel encoder after bits corresponding to the additional information have been added to a conventional FCH part. Therefore, a channel coding gain can be improved.

The subcarrier mapping unit 420 and the additional subcarrier mapping unit 440 map the codeword generated by the legacy encoder 410 and an additional codeword generated by the additional channel encoder 430 to subcarriers.

Figure 5:
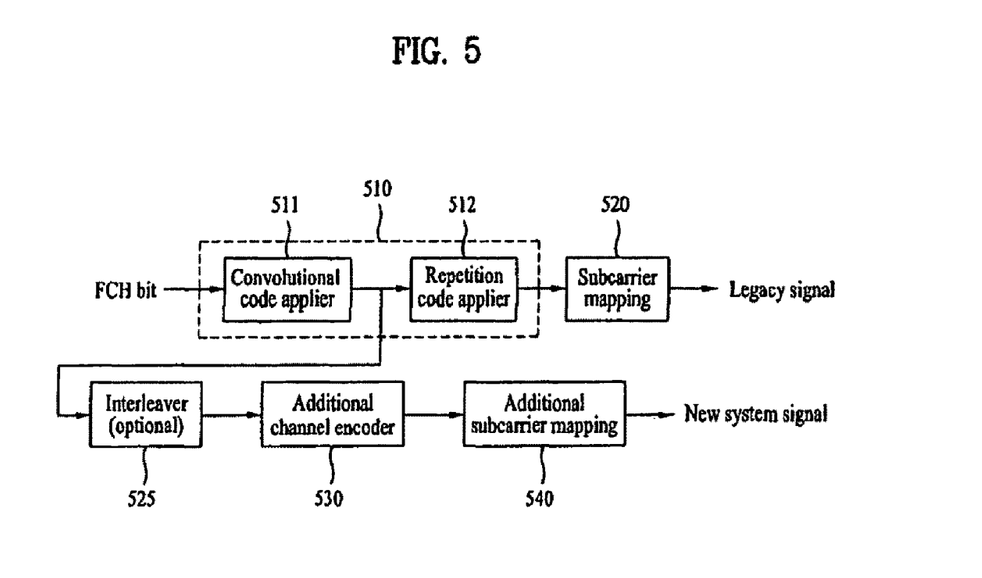
FIG. 5 is a block diagram illustrating a parity insertion device according to still another embodiment of the present invention.

FIG. 5 is a block diagram illustrating a parity insertion device according to still another embodiment of the present invention.

Referring to FIG. 5, a legacy encoder 510 sequentially applies a convolutional code and a repetition code to an FCH bit, and generates a codeword for a legacy terminal.

The additional channel encoder 530 channel-encodes a codeword extracted between a convolutional code applier 511 and a repetition code applier 512 of the legacy encoder 510, such that it generates an additional codeword.

For example, if the legacy encoder 510 applies the convolutional code at a code rate of 1/2 (i.e., 1/2 coding rate) and then applies the repetition code at a code rate of 1/4 (i.e., 1/4 coding rate), a channel encoder for an IEEE 802.16m system may be applied to an output signal to which only the convolutional code is applied. In fact, it is difficult to acquire a strong coding gain except for a time diversity using a repeated code (i.e., repetition code) at the same code rate, such that another code rate is applied to an output signal generated before the application of the repeated code and this application result may then be applied to a time-frequency resource area for the IEEE 802.16m. Therefore, the legacy terminal reads the FCH to which both the convolutional code of the 1/2 code rate and the repeated code of the 1/4 code rate are applied, and a terminal for use in the IEEE 802.16m is able to acquire a part read by the legacy terminal and IEEE 802.16m-only FCH information allocated to a new resource area. As a result, an FCH coverage of the IEEE 802.16m can be enhanced.

In this case, the codeword extracted between the convolutional code applier 511 and the repetition code applier 512 may be interleaved by an interleaver 525.

Figure 6:
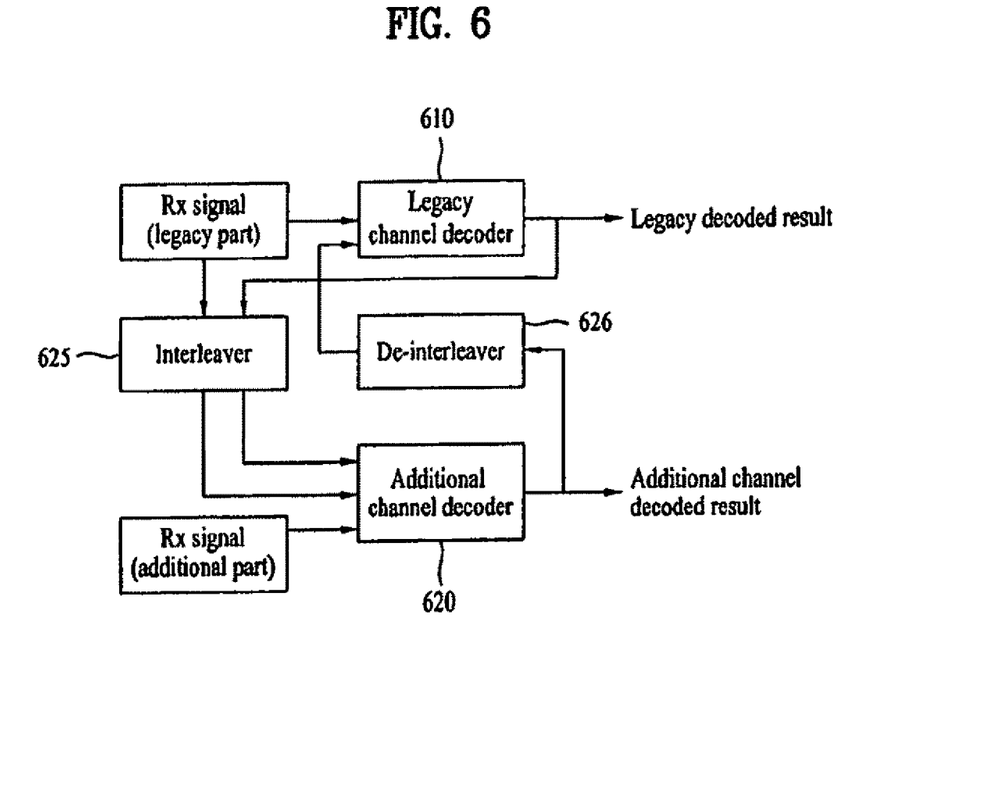
FIG. 6 is a block diagram illustrating a device for decoding a signal generated from the device of FIG. 4 according to the present invention.

FIG. 6 is a block diagram illustrating a device for decoding a signal generated from the device of FIG. 4 according to the present invention.

Referring to FIG. 6, if the result channel-encoded in the FCH is used as an information part of the additional channel encoder, a signal structure is configured in the form of a channel code concatenation, and this concatenated signal structure may be decoded in the form of a turbo-code format.

FIG. 6 shows that the channel decoding can be iteratively carried out. That is, the result of the legacy channel encoder 610 may be used as an input signal of an additional channel decoder 620, or the decoding result of the additional channel decoder 620 may be used as an input signal of the legacy channel decoder 610. The interleaver 625 and the de-interleaver 626 may be added or omitted according to specific information indicating whether or not a transmission end uses an interleaver.

In the meantime, a new FCH may be defined to increase the FCH coverage.

In this case, a method for defining the new FCH may be classified according to a first case having no legacy and a second case having the legacy.

According to the first case in which the legacy exists, there is no need to maintain the structure of a preamble and an FCH, and a new structure may be considered. In this case, the new FCH may indicate a specific FCH incapable of being understood by the legacy terminal. In more detail, according to this specific FCH, an FCH bit setup may be changed, a channel coding may be changed, information definition may be changed, or a subcarrier mapping may be changed, such that the legacy terminal is unable to understand this specific FCH.

According to the second case having no legacy, a new FCH may be located just behind a conventional preamble. Otherwise, a new preamble may be defined instead of a conventional preamble, and a new FCH may be located just behind this new preamble.

In the meantime, the preamble may be omitted from the conventional structure, only a new FCH is arranged. And, the preamble may be transferred separately from a new FCH according to a new definition. In this case, the position of a new preamble may be a specific location defined as an offset.

Therefore, if the preamble is arranged separately from the new FCH, i.e., if a downlink synchronous channel is presented in an arbitrary interval, a new FCH may be arranged at a position of the legacy preamble. Otherwise, the legacy FCH may be omitted on the condition that the lehacy terminal remains without any change, such that a new FCH may be arranged at a specific position distant from the preamble, i.e., at an offset position of at least '0'.

In case of the presence of legacy, the conventional preamble and FCH structure are maintained without any change. A new FCH is not understood by the legacy terminal, such that the legacy FCH exists without any change. A new terminal may decode only the legacy FCH, or may additionally decode a new FCH to improve coverage as necessary. If new information contained in the new FCH structure, the new terminal is able to decode only the new FCH. The above-mentioned operations are based on pre-defined specification, such that they do not provide a new terminal with unexpected load. In case of using the FCH according to this embodiment, a coverage capable of being given to the terminal may be changed according to an amount of used FCH parities.

Figure 7:
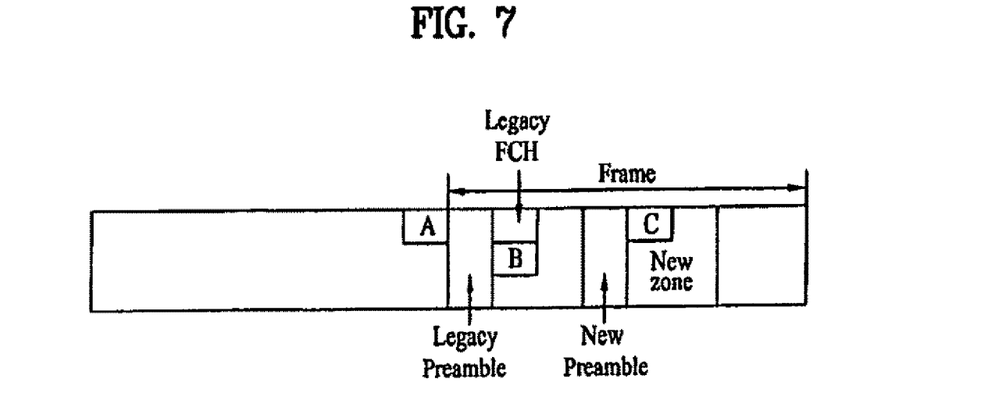
FIG. 7 is a conceptual diagram illustrating a method for inserting a new frame control header into a conventional frame according to the present invention.

FIG. 7 is a conceptual diagram illustrating a method for inserting a new frame control header into a conventional frame according to the present invention.

The system cannot arrange a new FCH (i.e., an FCH having an enhanced coverage and bit information) at a position of an FCH used by a conventional legacy. Therefore, a new FCH or an additional part of a legacy FCH must be moved to another position. A new FCH may be located at any one of positions 'A', 'B' and 'C', wherein the A position may be defined just before the legacy preamble, the B position is consecutive to both a preamble used by the legacy and the FCH, the C position is consecutive to a new preamble defined separately from the legacy.

As can be seen from the reference character 'A' of FIG. 7, it is preferable that a new FCH part may be arranged at a start point of a resource area used by a new system. As can be seen from the reference character 'B' of FIG. 7, a new FCH part may also be arranged in the legacy structure, or may be arranged at the end of a legacy MAP.

As can be seen from the reference character 'C' of FIG. 7, a new FCH part may be arranged at a start position of a part having a new MAP. In this case, the new preamble may be omitted. That is, if sufficient pilots are contained in the FCH part, there is no need for the preamble to be adjacent to the new FCH. Also, if it is assumed that there is a constant offset related to the legacy preamble, such that a start part of the new FCH can be readily detected.

Finally, in order to increase system information of the FCH, an additional field can be inserted into the FCH. In this case, a newly-added part may have a new structure formed by the modification of a conventional part, and may be consecutive to the end of the conventional FCH. If the encoding is newly carried out, the conventional structure for legacy may be encoded without any change, and the added field can be understood by only a new terminal, such that this field may be added and encoded at a newly-added encoding step.

Legacy FCH information may include contents for decoding MAP information. That is, the legacy FCH may have a channel encoding mode, a repetition mode, a total MAP size, and a sub-channel usage. However, the FCH information is not always changed to another, and is hardly changed to another, such that there is no need to always transfer the FCH information to each frame. If the FCH information is changed to another, a broadcast channel is generated, such that the changed FCH information may be transferred to the terminal along with channel usage description contents or system information.

Also, in order to guarantee robustness of a header, the conventional FCH has a code rate of 1/16, but there is no preparation for a header error. So, in order to solve this header error problem, it is preferable that a header check sequence may be further contained. The addition of the header check sequence can be carried out by adding a CRC code which is not too long. If the FCH is transferred to the terminal every time, some LSB bits of the frame number may be contained in a frame header, such that the terminal is able to properly perform an error check procedure. Also, MAP information or MIMO operation mode information may be contained in a conventional FCH.

A conventional FCH has a mode reserved in a coding indication at an FFT size of 128, and there are 4 or 5 bits reserved for another FFT size larger than the 128 FFT size. Therefore, the above-mentioned bits may also be used for other usages. For example, reserved bits of the conventional FCH may transfer new coding information applied to the MAP and operation mode information of a new system to the terminal. In other words, each reserved bit may include specific information indicating which one of structures is used to operate the system. For example, on/off operation for legacy support, an indication bit for a new channel, numerology information for MAP and burst, etc., may be contained in each reserved bit. Also, 16 combinations may be generated by each bit, and an operation mode of a system may be defined by the 16 combinations. Legacy dedicated information, new system dedicated information, new numerology information of a new system, and MIMO mode information may be used as terminal's operation information using the above combinations and their index information.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

INDUSTRIAL APPLICABILITY

As apparent from the above description, the present invention relates to a parity insertion method which extends an FCH coverage, improves an FCH robustness, and extends transferable information. This parity insertion method can be applied to an IEEE 802.16 system and a base station and a terminal of a system having a lower compatibility with the IEEE 802.16 system.

The invention claimed is:

1. A method for inserting parity into a frame control header comprising:
    channel-encoding, by a legacy encoder, a frame control header bit, and generating a codeword;
    channel-encoding, by an additional channel encoder, the frame control header bit applied to the legacy encoder, and generating an additional codeword; and
    mapping the codeword generated by the legacy encoder and the additional codeword to subcarriers,
    wherein the mapping the additional codeword to the subcarriers includes mapping the additional codeword to a resource area which is located at any one of a first position preceding a legacy preamble, a second position following a legacy Frame Control Header (FCH), and a third position consecutive to an additional preamble.

2. The method according to claim 1, wherein the generating the additional codeword includes applying any one of a convolutional code, a block code, and a repetition code to the frame control header bit.

3. The method according to claim 1, wherein the generating the additional codeword includes interleaving, by an additional interleaver, the frame control header bit, and encoding the interleaved bits.

4. The method according to claim 1, wherein the frame control header bit includes at least one of a CRC code for a header check sequence, a specific bit selected among bits indicating the number of frames, and information of a MIMO operation mode.

5. The method according to claim 1, wherein the frame control header bit includes at least one of information indicating a support or non-support of a legacy terminal, a new channel indication bit, and information for media access protocol (MAP) and burst in a reserved bit.

6. The method according to claim 1, wherein the legacy FCH includes additional bits arranged to be consecutive to a conventional FCH structure, and
    wherein the generating the additional codeword includes applying only legacy bits to the legacy encoder, and applying the additional bits to the additional channel encoder.

7. The method according to claim 1, wherein the channel-encoding by the additional channel encoder further comprises:
    inserting a repeated parity in which parity of the frame control header is repeated to be consecutive to a sub-channel of the frame control header within an OFDM symbol of the frame control header; and
    channel-encoding the frame control header in which the repeated parity is inserted.

8. The method according to claim 1, wherein the channel-encoding by the additional channel encoder further comprises:
    inserting a repeated parity in which parity of the frame control header is repeated, into the same sub-channel as that of the frame control header at another OFDM symbol different from that of the frame control header; and
    channel-encoding the frame control header in which the repeated parity is inserted.

9. A method for inserting parity into a frame control header comprising:
    channel-encoding, by a legacy encoder, a frame control header bit, and generating a codeword;
    channel-encoding, by an additional channel encoder, the codeword, and generating an additional codeword; and
    mapping the codeword generated by the legacy encoder and the additional codeword to subcarriers,
    wherein the mapping the additional codeword to the subcarriers includes mapping the additional codeword to a resource area which is located at any one of a first position preceding a legacy preamble, a second position following a legacy Frame Control Header (FCH), and a third position consecutive to an additional preamble.

10. The method according to claim 9, wherein the frame control header bit includes at least one of a CRC code for a header check sequence, a specific bit selected among bits indicating the number of frames, and information of a MIMO operation mode.

11. The method according to claim 9, wherein the frame control header bit includes at least one of information indicating a support or non-support of a legacy terminal, a new channel indication bit, and information for MAP and burst in a reserved bit.

12. A method for inserting parity into a frame control bit comprising:
    channel-encoding, by an additional channel encoder, an output value to which a convolutional code is applied by a legacy encoder which sequentially applies the convolutional code and a repeated code to a frame control header bit, and generating an additional codeword; and
    mapping the additional codeword to subcarriers,
    wherein the mapping the additional codeword to the subcarriers includes mapping the additional codeword to a resource area which is located at any one of a first position preceding a legacy preamble, a second position following a legacy Frame Control Header (FCH), and a third position consecutive to an additional preamble.

13. The method according to claim 12, wherein the generating the additional codeword includes channel-encoding the output value obtained when the convolutional code is applied to the frame control header bit at a code rate of 1/2.

14. The method according to claim 12, wherein the generating the additional codeword includes channel-encoding the output value to which the convolutional code is applied at another code rate which is different from the code rate made when the legacy encoder applies the repeated code.

* * * * *